United States Patent
Wang et al.

(10) Patent No.: US 11,836,576 B2
(45) Date of Patent: Dec. 5, 2023

(54) DISTRIBUTED MACHINE LEARNING AT EDGE NODES

(71) Applicant: International Business Machines Corporation, Armonk, NY (US)

(72) Inventors: Shiqiang Wang, White Plains, NY (US); Tiffany Tuor, London (GB); Theodoros Salonidis, Boston, MA (US); Christian Makaya, Summit, NJ (US); Bong Jun Ko, Harrington Park, NJ (US)

(73) Assignee: International Business Machines Corporation, Armonk, NY (US)

( * ) Notice: Subject to any disclaimer, the term of this patent is extended or adjusted under 35 U.S.C. 154(b) by 1637 days.

(21) Appl. No.: 15/952,625

(22) Filed: Apr. 13, 2018

(65) Prior Publication Data

US 2019/0318268 A1   Oct. 17, 2019

(51) Int. Cl.
*G06Q 30/00* (2023.01)
*G06N 20/00* (2019.01)
*H04L 67/10* (2022.01)
*H04L 67/12* (2022.01)

(52) U.S. Cl.
CPC ............. *G06N 20/00* (2019.01); *H04L 67/10* (2013.01); *H04L 67/12* (2013.01)

(58) Field of Classification Search
CPC .......... G06N 20/00; H04L 67/10; H04L 67/12
See application file for complete search history.

(56) References Cited

U.S. PATENT DOCUMENTS

| 9,633,315 B2 | 4/2017 | Chapelle et al. |
| 9,727,423 B2 | 8/2017 | Dornquast et al. |
| 2016/0071027 A1 | 3/2016 | Brand et al. |

(Continued)

FOREIGN PATENT DOCUMENTS

| CN | 101895568 A | * 11/2010 | ......... H04L 67/1095 |
| EP | 2120181 | 11/2009 | |

OTHER PUBLICATIONS

Corentin Hardy, et al., "Distributed deep learning on edge-devices: feasibility via adaptive compression," retrieved from the internet: https://arxiv.org/pdf/1702.04683.pdf, Nov. 6, 2017, 8 pages.

(Continued)

*Primary Examiner* — Alvin L Brown
(74) *Attorney, Agent, or Firm* — CANTOR COLBURN LLP; Anthony Mauricio Pallone

(57) ABSTRACT

A training process of a machine learning model is executed at the edge node for a number of iterations to generate a model parameter based at least in part on a local dataset and a global model parameter. A resource parameter set indicative of resources available at the edge node is estimated. The model parameter and the resource parameter set are sent to a synchronization node. Updates to the global model parameter and the number of iterations are received from the synchronization node based at least in part on the model parameter and the resource parameter set of edge nodes. The training process of the machine learning model is repeated at the edge node to determine an update to the model parameter based at least in part on the local dataset and updates to the global model parameter and the number of iterations from the synchronization node.

20 Claims, 7 Drawing Sheets

(56) References Cited

U.S. PATENT DOCUMENTS

| | | |
|---|---|---|
| 2017/0279849 A1 | 9/2017 | Weibel et al. |
| 2017/0286864 A1 | 10/2017 | Fiedel et al. |
| 2017/0300830 A1 | 10/2017 | Kadav et al. |
| 2018/0032915 A1 | 2/2018 | Nagaraju et al. |
| 2019/0220697 A1* | 7/2019 | Kiemele ............... G06F 18/285 |
| 2020/0219010 A1* | 7/2020 | Jobling ................ G06F 16/285 |
| 2023/0025002 A1* | 1/2023 | Konrardy ............ H04L 12/2803 |

OTHER PUBLICATIONS

H. Brendan McMahan, et al., "Communication-Efficient Learning of Deep Networks from Decentralized Data," in Proc. of AISTATS, Feb. 2017, 10 pages.

K. Hsieh, et al., "Gaia: Geo-Distributed Machine Learning Approaching LAN Speeds," in NSDI Mar. 2017, 21 pages.

M. Li, et al., "Scaling Distributed Machine Learning with the Parameter Server," In OSDI, vol. 1, No. 10.4, Oct. 2014, 16 pages.

S. Wang, et al., "When Edge Meets Learning: Adaptive Control for Resource-Constrained Distributed Machine Learning," Jul. 31, 2017, IEEE INFOCOM 2018, Grace Period Disclosure, 14 pages.

\* cited by examiner

DISTRIBUTED MACHINE LEARNING AT EDGE NODES

STATEMENT REGARDING FEDERALLY SPONSORED RESEARCH OR DEVELOPMENT

This invention was made with Government support under W911NF-16-3-0001 awarded by U.S. Army. The Government has certain rights in this invention.

STATEMENT REGARDING PRIOR DISCLOSURES BY THE INVENTOR OR A JOINT INVENTOR

DISCLOSURE(S): "When Edge Meets Learning: Adaptive Control for Resource-Constrained Distributed Machine Learning"; Shigiang Wang, Tiffany Tuor, Theodoros Salonidis, Kin K. Leung, Christian Makaya, Ting He, Kevin Chan; Jul. 31, 2017; 14 pages.

BACKGROUND

The present invention generally relates to computer systems and, more specifically, to distributed machine learning at edge nodes of a distributed computer system.

Large amounts of data can be generated at the edge of a distributed (e.g., networked) computer system, which may include user interface devices, sensors, wireless adapters, and other such devices with computation and communication resources. Machine learning models can be built from data collected at edge nodes of the distributed computer system to enable the detection, classification, and prediction of future events.

SUMMARY

According to one or more embodiments of the present invention, a computer-implemented method for distributed machine learning at an edge node of a distributed computer system includes executing a training process of a machine learning model at an edge node for a number of iterations to generate a model parameter based at least in part on a local dataset and a global model parameter. A resource parameter set indicative of resources available at the edge node is estimated. The model parameter and the resource parameter set are sent to a synchronization node. Updates to the global model parameter and the number of iterations are received from the synchronization node based at least in part on the model parameter and the resource parameter set of edge nodes. The training process of the machine learning model is repeated at the edge node to determine an update to the model parameter based at least in part on the local dataset, updates to the global model parameter, and the number of iterations from the synchronization node.

Other embodiments of the invention implement the features of the above-described method in a computer system and in a computer program product.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
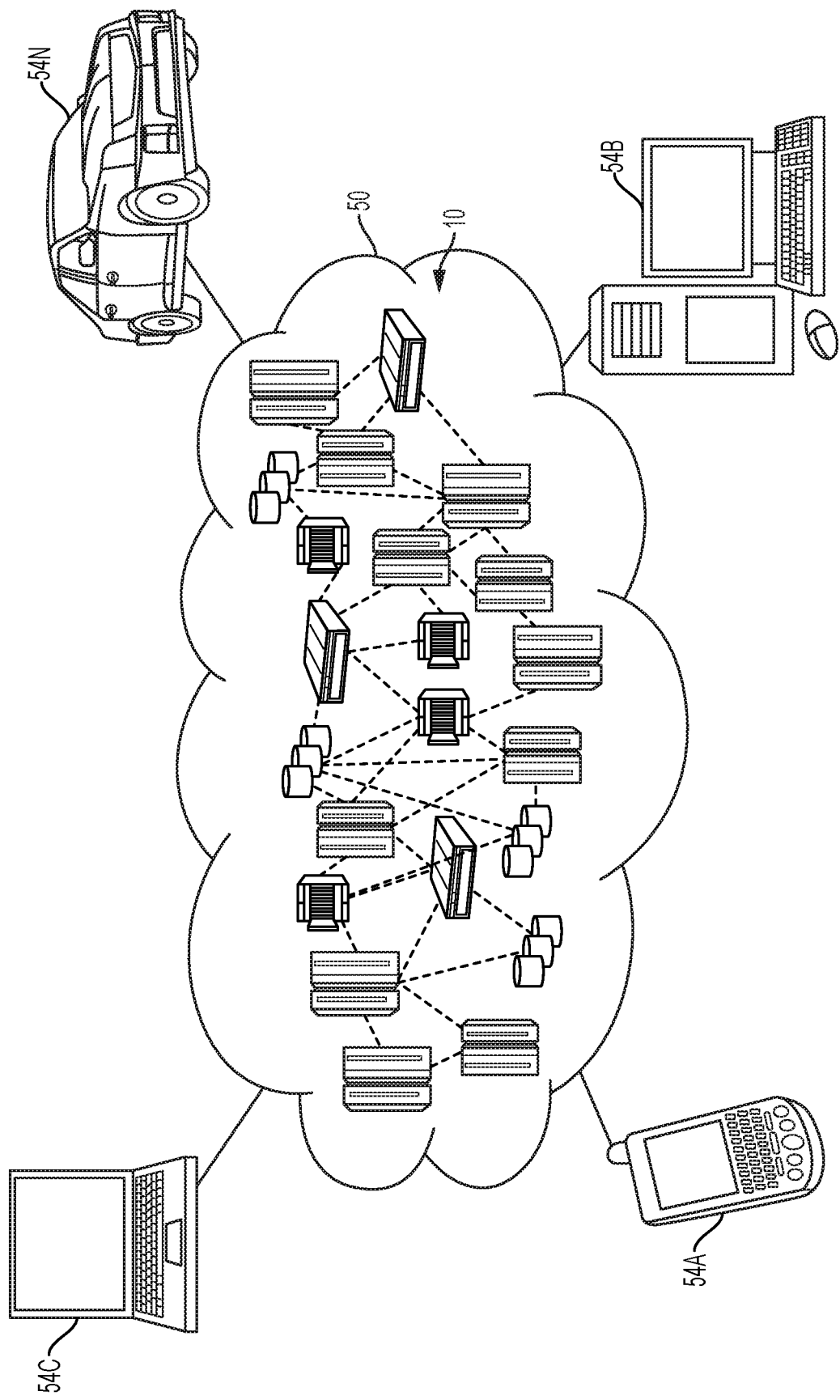
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

One or more embodiments of the present invention can be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
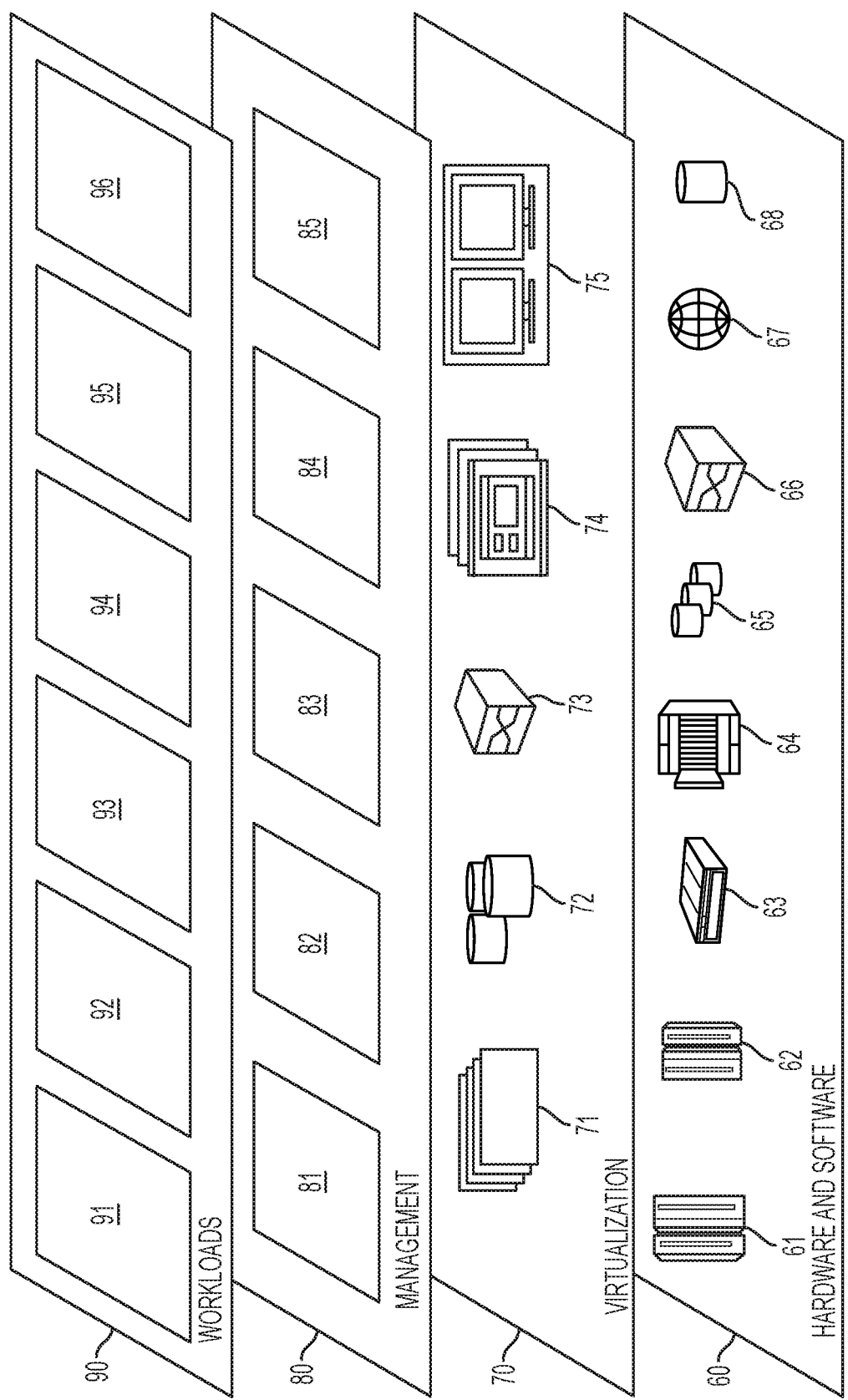
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and collaborative adaptive machine learning 96. The collaborative adaptive machine learning 96 can include functions of a synchronization node of a distributed computing system to enable distributed machine learning at edge nodes of the distributed computing system as further described herein.

Figure 3:
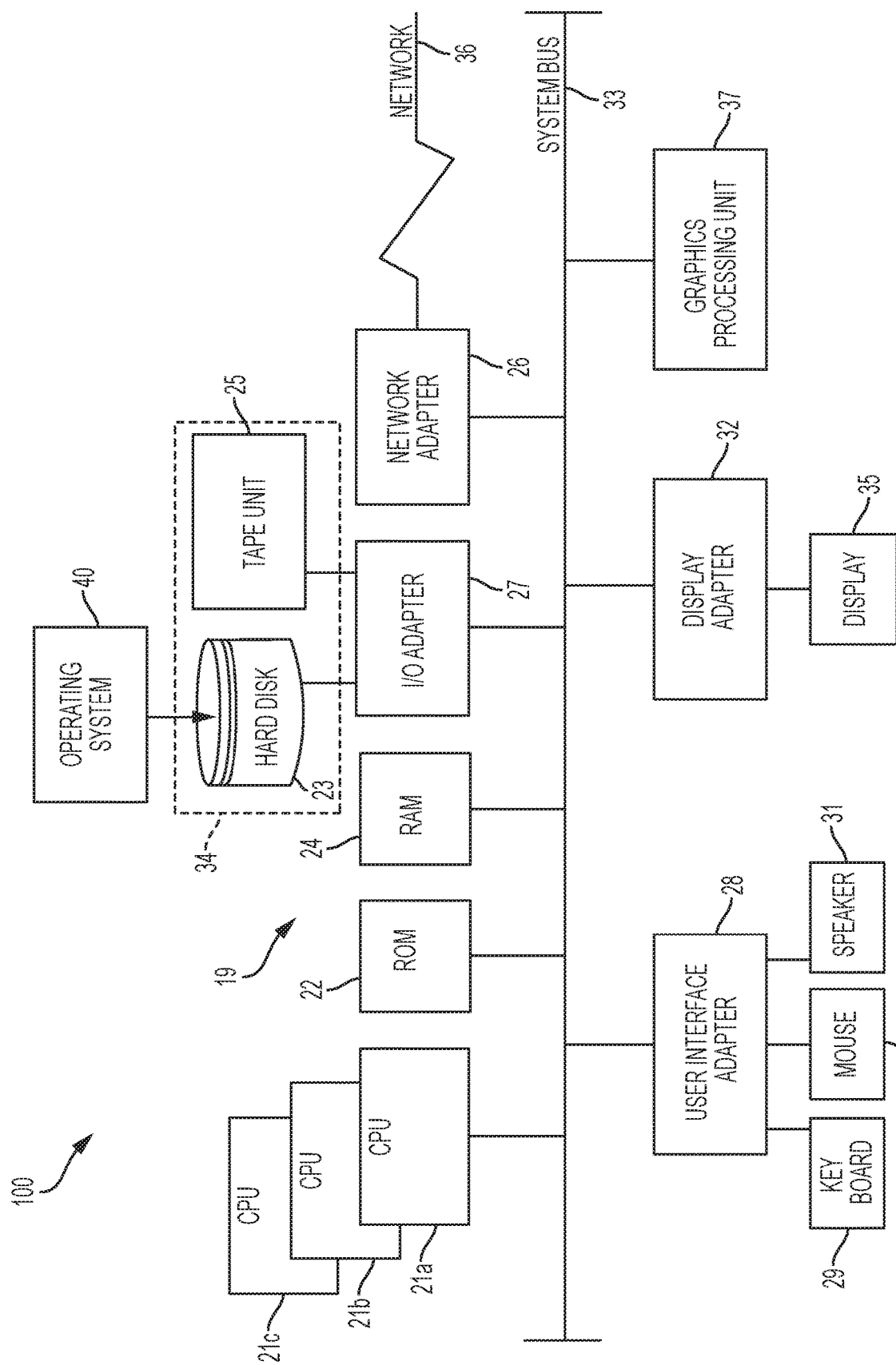
FIG. 3 depicts a block diagram of a processing system for implementing embodiments of the present invention.

It is understood that one or more embodiments of the present invention are capable of being implemented in conjunction with any other type of computing environment now known or later developed. For example, FIG. 3 depicts a block diagram of a processing system 100 for implementing the techniques described herein. The processing system 100 is an example of a computing node 10 of FIG. 1. In examples, processing system 100 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 100.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 100 can be stored in mass storage 34. The RAM 22, ROM 24, and mass storage 34 are examples of memory 19 of the processing system 100. A network adapter 26 interconnects system bus 33 with an outside network 36 enabling the processing system 100 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 100 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 100 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 100.

Turning now to an overview of technologies relevant to aspects of the disclosed system, due to bandwidth, storage, and privacy concerns, it may be impractical to send all data from edge nodes of a distributed computer system to a centralized location to support machine learning. Typically, machine learning models are large and perform training in powerful backend server machines and/or cloud environments (e.g., the cloud computing environment 50 described in FIG. 1). Simplified versions of machine learning models may be ported to run on mainstream mobile platforms, such as ANDROID® and IOS®. These models may have less accuracy than their backend server counterparts and/or are designed to perform specialized object recognition tasks (e.g. optical character recognition, language translation, etc.).

Machine learning model accuracy can be improved using machine learning model adaptation techniques. These adaptation techniques assume that the training data of the target domain is already available. An effective machine learning model adaptation typically requires high-quality training instances (i.e., good feature data and correct labelling) captured from the target domain. However, in general learning tasks, obtaining such high-quality training instances can be challenging due to highly variable domains. An additional challenge is that machine learning model training approaches typically assume that training data must be uploaded to a backend server where machine learning model adaptation will occur. This can incur a high cost in terms of bandwidth, energy, and user privacy.

In summary, existing machine learning approaches do not effectively address the challenges of varying domains and cost in terms of network bandwidth, energy, and user privacy. In addition, existing approaches do not provide an efficient approach for online training for a plurality of edge nodes in a distributed computer system.

Turning now to an overview of the aspects of the invention, one or more embodiments of the invention address the above-described shortcomings of the prior art by providing a training process for a machine learning model at edges nodes of a distributed computer system and coordinating training across the edge nodes using a synchronization node. This distributed learning approach enables training of a machine learning model using distributed data at multiple nodes without sending all of the raw data to a centralized node.

The above-described aspects of the invention address the shortcomings of the prior art by performing local parameter updates at edge nodes and global synchronization to combine parameters from across nodes to iteratively perform machine learning model training with respect to a resource budget. A synchronization interval, defining a number of iterations for edge node training, can change globally to adjust for changes in edge node resources. The synchronization node can broadcast global model parameters to edge nodes, and the edge nodes can send updated model parameter and a resource parameter set to the synchronization node after performing training on local datasets for the number of iterations defined by the synchronization node. The synchronization node can determine whether to repeat the training process at the edge nodes to maintain a resource budget and reduce model parameter variation. Technical effects and benefits can include reducing network bandwidth demands, reducing centralized storage requirements, and maintaining privacy of local data at the edge nodes.

Figure 4:
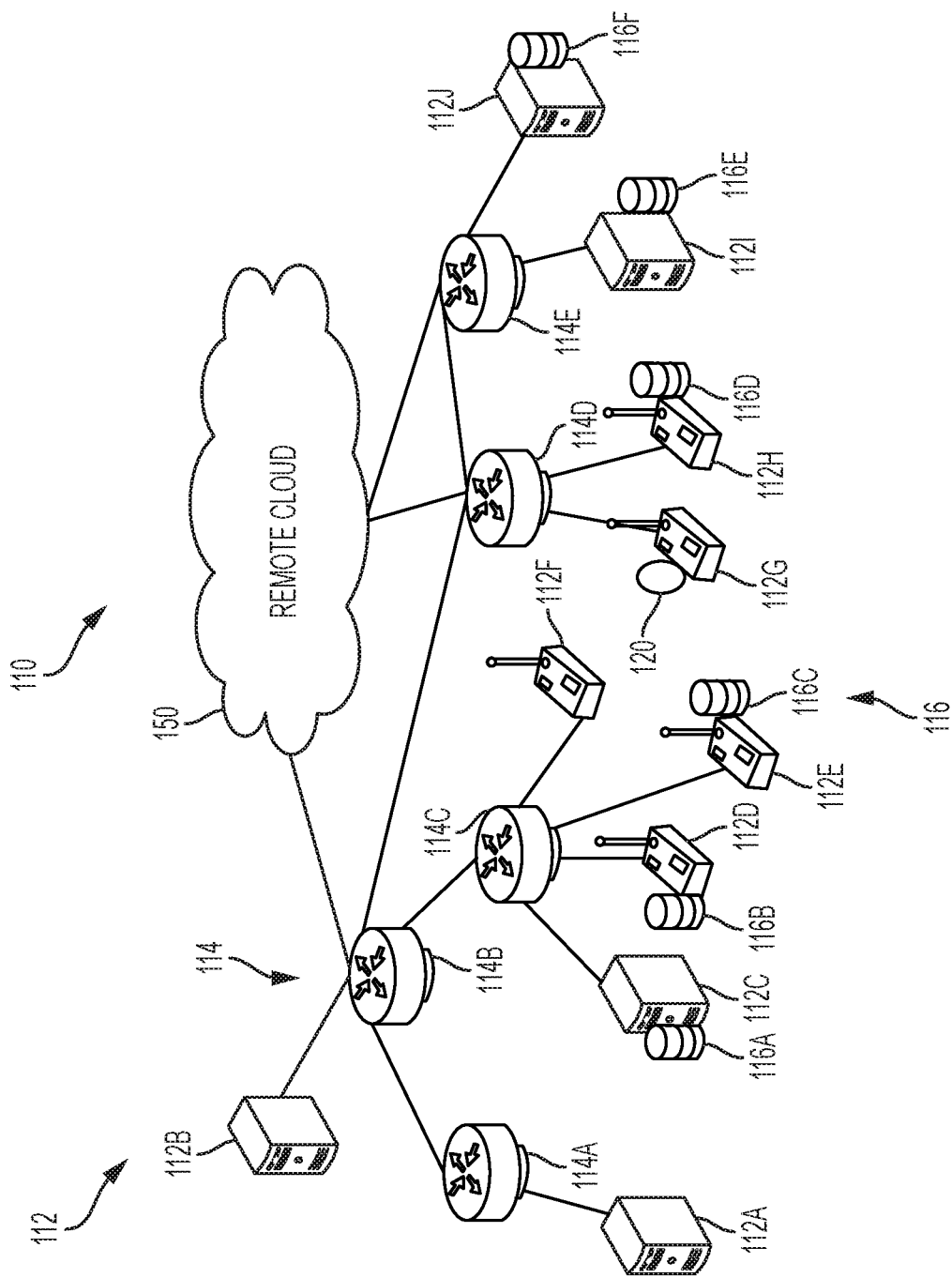
FIG. 4 depicts a block diagram of a system according to one or more embodiments of the present invention.

Turning now to a more detailed description of aspects of the present invention, FIG. 4 depicts a block diagram of a distributed computer system 110 for distributed machine learning at a plurality of edge nodes 112 according to one or more embodiments of the present invention. The distributed computer system 110 can include a plurality of network elements 114 (e.g., network elements 114A-114E) operable to enable communication between the edge nodes 112 (e.g., edge nodes 112A-112.1) and a remote cloud 150, where the remote cloud 150 can be a portion of a cloud computing environment (e.g., the cloud computing environment 50 of FIG. 1). The edge nodes 112 may include one or more of: a sensor, a gateway, a micro-server, a wireless communication access node, or any other type of entity having computation and networking capabilities, such as the processing system 100 of FIG. 3. The network elements 114 can include routers, switches, gateways, and other such elements to support communication known in the art. The edge nodes 112 can have local data stores 116 (e.g., local data storage 116A-116F) that may hold local datasets to support training and performance of machine learning. According to aspects of the invention, one of the edge nodes 112 shown in FIG. 4 has been designated as a synchronization node 120 that coordinates the training of a machine learning model.

In the example of FIG. 4, edge node 112A is communicatively coupled to network element 114A which in turn is communicatively coupled to edge node 112B, network element 114C, network element 114D, and remote cloud 150. Network element 114C is communicatively coupled to edge nodes 112C, 112D, 112E, 112F. Network element 114D is communicatively coupled to edge nodes 112G, 112H, network element 114E, and remote cloud 150. Network element 114E is communicatively coupled to edge nodes 112I, 112J, and remote cloud 150. Edge node 112C includes a local data store 116A; edge node 112D includes a local data store 116B; edge node 112E includes a local data store 116C; edge node 112H includes a local data store 116D; edge node 112I includes a local data store 116E; and, edge node 112J includes a local data store 116F. Although a specific configuration is depicted in the example of the distributed computer system 110 of FIG. 4, it will be understood that the distributed computer system 110 can include any combination of edge nodes 112 and network elements 114, and may exclude the remote cloud 150 or include additional elements (not depicted).

In accordance with embodiments of the invention, the distributed computer system 110 is configured and arranged to enable distributed machine learning. The phrase "machine learning" broadly describes a function of electronic systems that learn from data. A machine learning system, engine, or module can include a machine learning algorithm that can be trained in a distributed environment, such as the distributed computer system 110, to learn functional relationships between inputs and outputs that are currently unknown. Examples of machine learning models can include, for instance, support vector machines, linear regression, K-means, and various neural networks.

A machine learning model can include a plurality of parameter vectors that can be learned from training data. A sample j in the training data set may include a vector $x_j$ representing the model input and a scalar $y_j$ representing the desired model output. During the learning procedure, each model can have a loss function defined on every data sample j. The loss function can also depend on the current model parameter w. One can denote the loss function as $f(w, x_j, y_j)$ or $f_j(w)$. The loss function captures the training error of the model and the goal of machine learning is to minimize the loss function. If it is assumed that there are N edge nodes 112 with local datasets $D_1, D_2, \ldots, D_N$ in local data stores 116, the global loss function can be defined as a weighted average of all local functions as:

$$F(w) \triangleq \frac{\sum_{i=1}^{N} D_i F_i(w)}{D}$$

where the local loss function $F_i(w)$ is the average of $f_j(w)$ for all data sample j in the local dataset D.

The problem of machine leaning can be expressed as finding:

$$w^* = \arg\min F(w).$$

The solution to this problem may be found by using gradient-descent techniques, for instance.

As an example of a distributed gradient-descent algorithm, each node i has its local model parameter $w_i(t)$, where $t=0, 1, 2, \ldots$ denotes an iteration index. The local parameters for all nodes can be initialized to the same value at $t=0$. For $t>0$, new values of $w_i(t)$ may be computed according to a gradient-descent update rule on the local loss function, based on $w_i(t-1)$, at each individual edge node 112 with index i. After one or multiple iterations performed locally at edge nodes 112, a global synchronization step is performed through the synchronization node 120 to update the local parameter at each node to the weighted average of the parameters of all nodes. After global synchronization, the local parameter $w_i(t)$ at each node i can change. A local update in each iteration t can be performed on $w_i(t)$ after possible global synchronization in the previous iteration $t-1$.

It can be defined that $\tau$ steps of local iterations are performed at each node between every two global synchronizations. The value of $\tau$ can be defined as the total number of iterations during a round of one or multiple consecutive local iterations without global synchronization. The distributed gradient descent algorithm can be distributed between the synchronization node 120 and edge nodes 112 by exchanging various parameters rather than the underlying training data in local datasets. If global synchronization is performed after every local update step (i.e., $\tau=1$), the distributed gradient descent procedure (ignoring communication aspects) can be equivalent to a centralized gradient descent procedure, where the centralized gradient descent procedure considers that all data samples are available at a centralized location and the global loss function and its gradient can be observed directly. This equivalence when $\tau=1$ is because of the linearity of the gradient. The equivalence generally does not hold for $\tau>1$.

Known approaches to implementing distributed learning can consume a large amount of resources especially when there is a large amount of training data. A large amount of data is usually necessary for accurate model training. The consumed resource can include monetary cost, energy, time, etc. The distributed computer system 110, in accordance with aspects of the invention, is configured and arranged to limit the resource consumption to avoid system backlog and lower the operational cost. This can be important in edge computing systems where resources at edge nodes are not as abundant as in data centers.

Therefore, one consideration is how to make efficient use of a given amount of resources to minimize the loss function of model training. For the distributed gradient-descent based learning approach, optimal values of T and $\tau$ may be sought, such that F(w) is minimized subject to a given resource constraint for a learning task.

Convergence analysis can be used to find an upper bound of:

$$F(w(T)) - F(w^*) \leq \frac{1}{T\left(\omega\eta\left(1 - \frac{\beta\eta}{2}\right) - \frac{\rho h(\tau)}{\tau\varepsilon^2}\right)}$$

subject to constraints, where:

$$h(\tau) \triangleq \frac{\delta}{\beta}((\eta\beta + 1)^\tau - 1) - \eta\delta\tau$$

where $\delta$ is a gradient deviation between local and global losses, $\beta$ is a smoothness parameter of a loss function, $\eta$ can be constrained to values less than or equal to $1/\beta$, and c is greater than 0 and less than or equal to the upper bound. The value of $\tau$ may be defined as a number of local updates between two synchronizations. The value of T may be defined as a total number of local updates. A resource budget can be expressed as B. A cost of a local update can be expressed as c, while a cost of global synchronization can be expressed as b. Parameters c, b, $\delta$, and $\beta$ can be estimated as part of a control process in real time. A step size can be selected as a small enough value to ensure convergence. Global synchronization can be performed frequently enough so that the local gradients do not deviate much from the global gradient; otherwise, the algorithm may not converge.

In some embodiments, the value of number of iterations $\tau$ can be based on a mathematically derived expression as:

$$\tau^* = \arg\max_\tau G(\tau), \text{ where:}$$

$$G(\tau) \triangleq \frac{\tau}{\tau + a}\left(\eta\left(t - \frac{\beta\eta}{2}\right) - \frac{\rho h(\tau)}{\tau\varepsilon^2\omega}\right)$$

$$h(\tau) \triangleq \frac{\delta}{\beta}((\eta\beta + 1)^\tau - 1) - \eta\delta\tau.$$

The function $G(\tau)$ can be computed as having a unique maximum that is strictly concave. The value of $\tau^*$ can be found using a binary search and can converge after a period of time.

Figure 5:
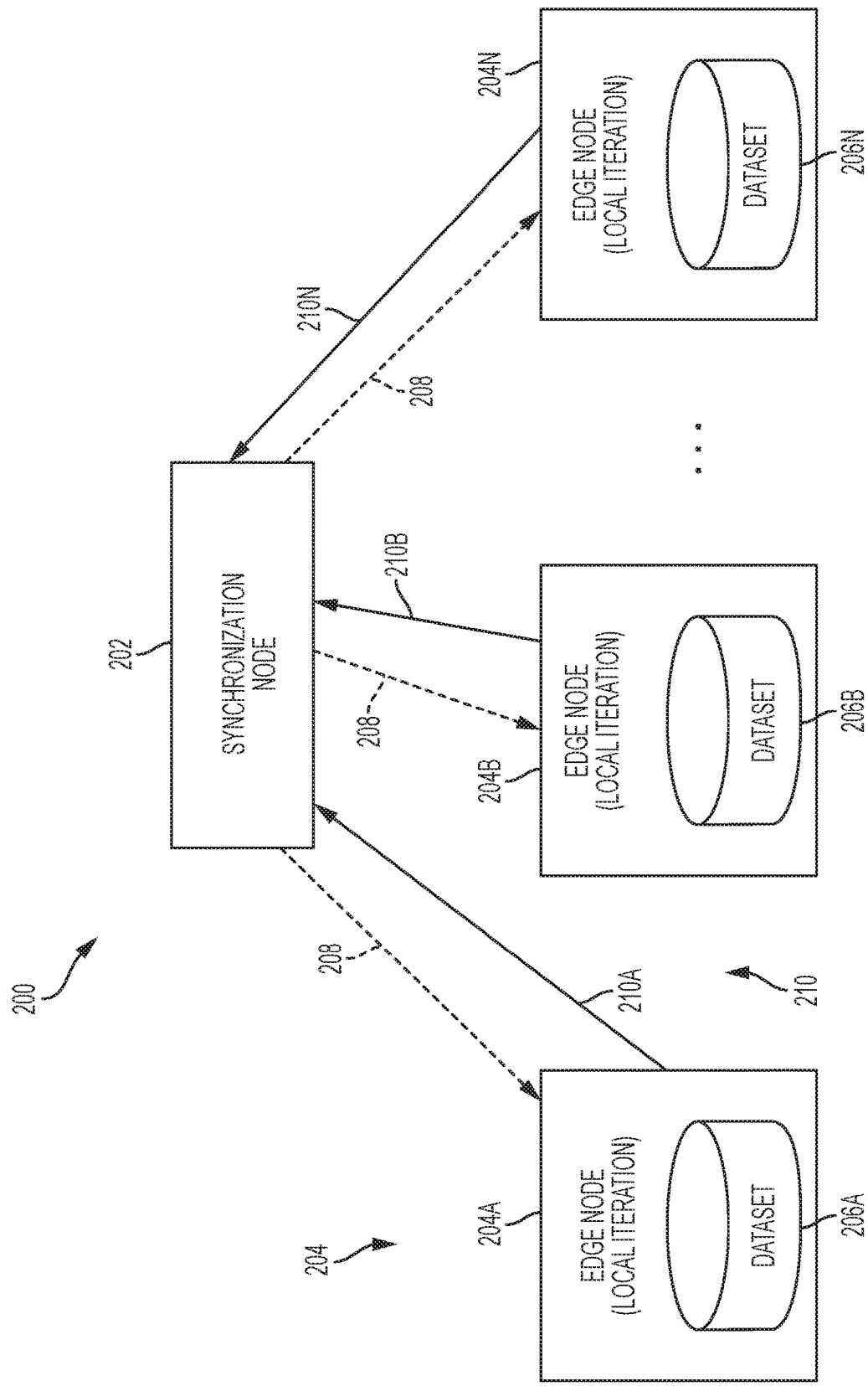
FIG. 5 depicts a block diagram of a synchronization node and a plurality of edge nodes according to one or more embodiments of the present invention.

FIG. 5 depicts a block diagram 200 of a synchronization node 202 and a plurality of edge nodes 204 according to one or more embodiments. The synchronization node 202 is an example of the synchronization node 120 of FIG. 4. The edge nodes 204 can each include local data sets 206 and are examples of the edge nodes 112 with local data stores 116 of FIG. 4. The synchronization node 202 can broadcast global model parameters 208 that are synchronized to the edge nodes 204 and receive new model parameters 210 from the edge nodes 204 after a pre-specified number of local iterations $\tau$. For instance, edge node 204A can include a local dataset 206A and may receive the global model parameters 208 and send new model parameters 210A to the synchronization node 202. Similarly, edge node 204B can include a local dataset 206B and may receive the global model parameters 208 and send new model parameters 210B to the synchronization node 202. The process can be performed across any number of edge nodes 204, such as edge node 204N with local dataset 206N receiving the global model parameters 208 and sending new model parameters 210N to the synchronization node 202, where N is an arbitrary number of edge nodes 204. Thus, edge nodes 204A, 204B, . . . , 204N receive synchronized values of the global model parameters 208 but provide the synchronization node 202 with locally generated values of the new model parameters 210A, 210B, . . . , 210N, which can vary between edge nodes 210A-201N. The global model parameters 208 can include a global value of a model parameter (w(t)), and the new model parameters 210 can include local values of a model parameter $w_i(t)$ for nodes i=1 . . . N at time step t.

Figure 6:
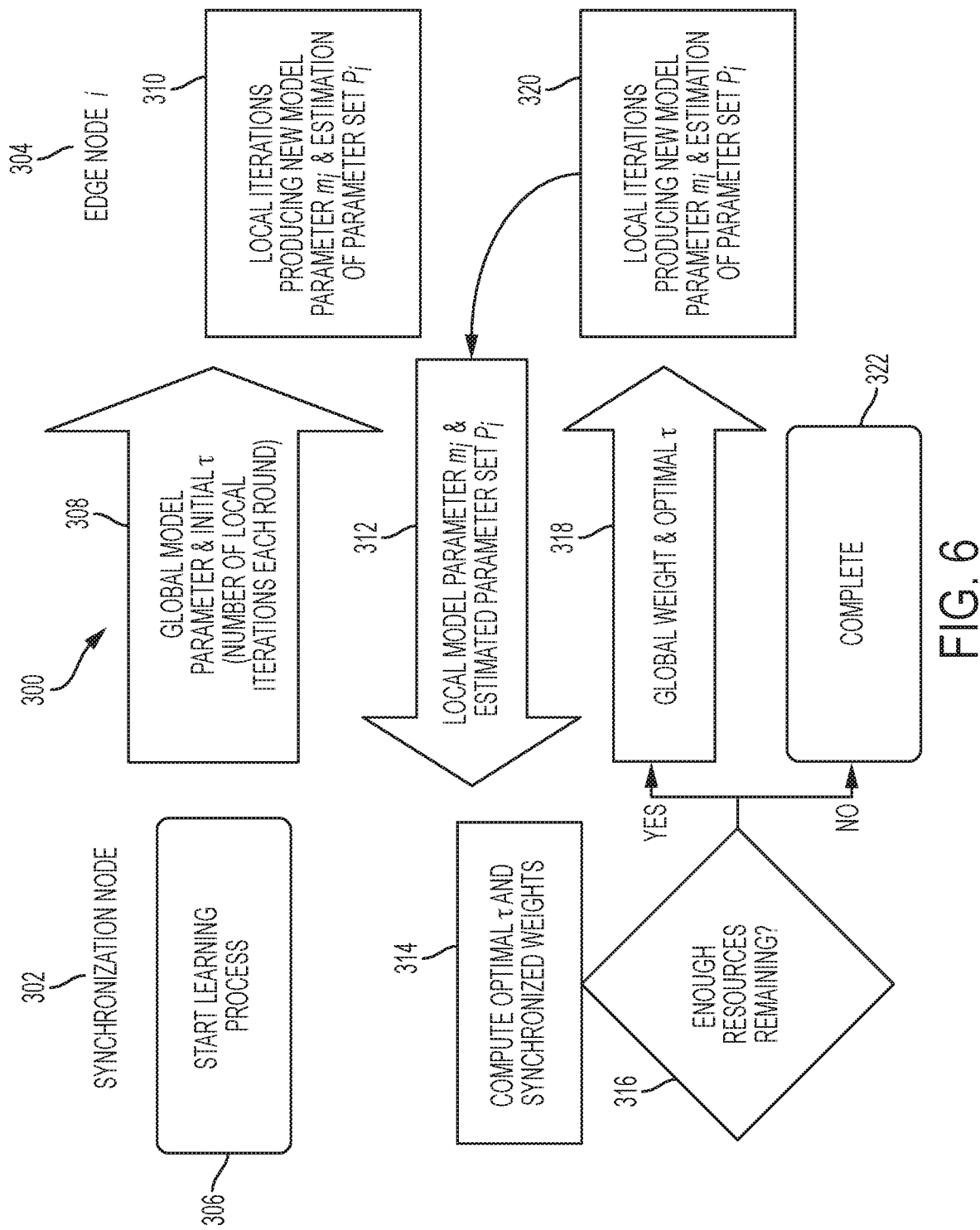
FIG. 6 depicts a flow diagram of interactions between a synchronization node and an edge node according to one or more embodiments of the present invention.

FIG. 6 depicts a flow diagram of a process 300 of interactions between a synchronization node 302 and an edge node 304 according to one or more embodiments, which is substantially described as transitions horizontally between elements and vertically as the process 300 advances. The synchronization node 302 is an example of the synchronization node 202 of FIG. 5, and the edge node 304 is an example of one of the edge nodes 204 of FIG. 5. At block 306, the synchronization node 302 starts a learning process to determine initial values of a global model parameter m (which may be equivalent to w(t)) and an initial value of a number of iterations τ, which are sent at block 308 to the edge node 304 and other edge nodes 304.

At block 310, edge node 304 performs local iterations of a training process to produce a new model parameter $m_i$ (which may be equivalent to $w_i(t)$) and an estimation of a resource parameter set $P_i$. The resource parameter set $P_i$ may include, for example, metrics including two or more of: available computation resources (e.g., available CPU cycles) at the edge node 304; available communication resources (e.g., bandwidth, delay) between the edge node 304 and the synchronization node 302; data distribution at the edge node 304 (e.g., capturing the similarity/difference of a local dataset at the edge node 304 from the collection of all local datasets at all edge nodes 304), which can be estimated based on a function computed on the gradients computed at different edge nodes 304; and, noisiness of the data at the edge node 304 (such as the statistical divergence of data samples).

At block 312, the edge node 304 sends the model parameter $m_i$ and the resource parameter set $P_i$ to the synchronization node 302. At block 314, the synchronization node 302 can compute an update of the global model parameter m (which may also be referred to as synchronized weights) and the number of iterations τ. At block 316, the synchronization node 302 can determined whether sufficient resources remain, for instance, by determining an amount of remaining resources R based at least in part on metrics of the resource parameter set $P_i$ for each edge node 304, and comparing the remaining resources R to a resource budget B. If there are sufficient resources remaining, at block 318, the synchronization node 302 sends the updates of the global model parameter m and the number of iterations τ to the edge node 304. At block 320, the edge node 304 can again perform local iterations of a training process to produce a new model parameter $m_i$ and an estimation of a resource parameter set $P_i$, which are returned to the synchronization node 302 at block 312. Otherwise, at block 316, if insufficient resources remain, the process 300 completes at block 322.

Figure 7:
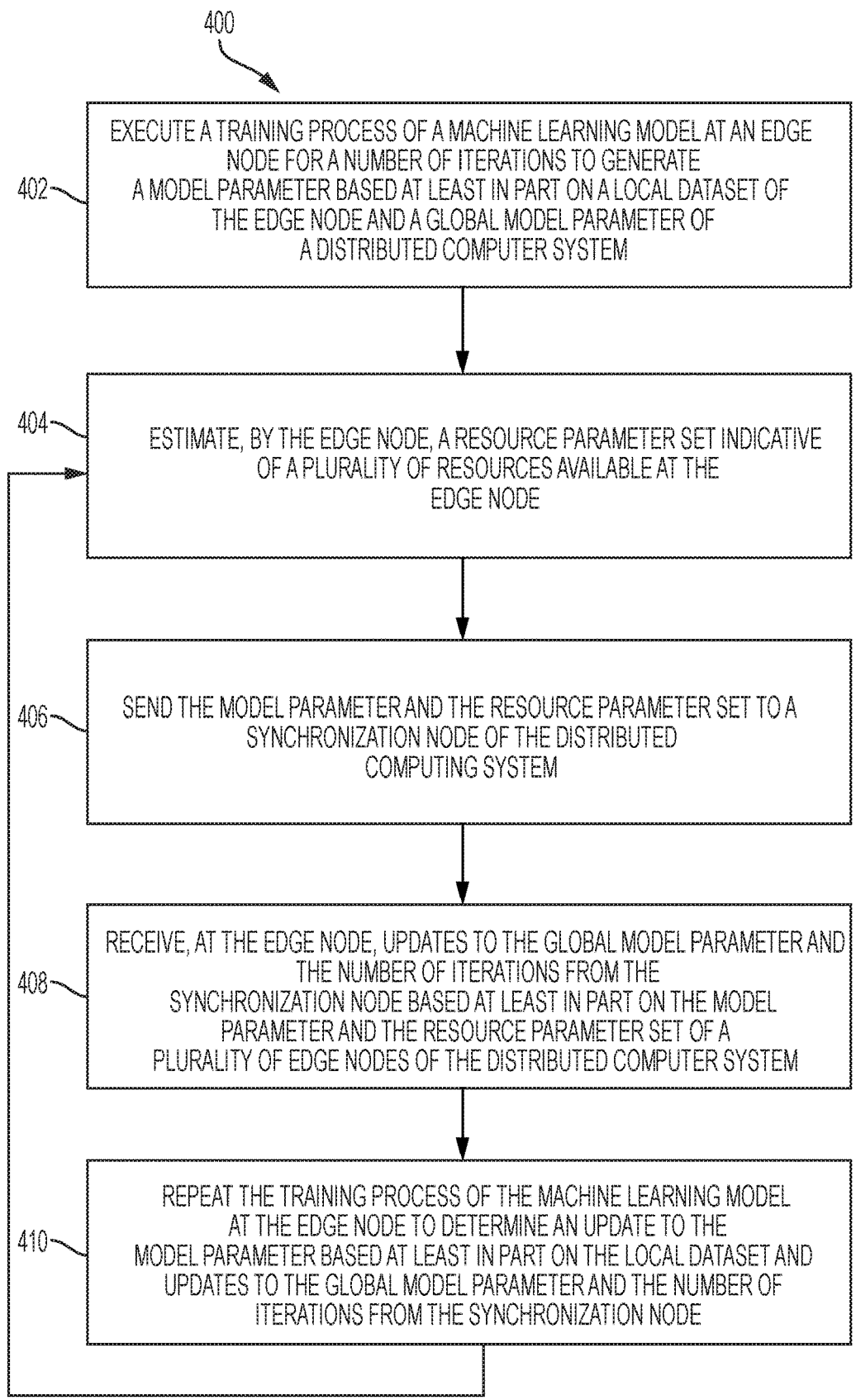
FIG. 7 depicts a flow diagram of a method according to one or more embodiments of the present invention.

FIG. 7 depicts a flow diagram of a method 400 according to one or more embodiments. The method 400 is described with respect to FIGS. 1-7 and may include additional steps and/or be further subdivided or combined. For purposes of explanation, the method 400 is described in greater detail in reference to the example of FIG. 5 but is applicable to the examples of FIGS. 4, 6, and other configurations.

At block 402, edge node 204A executes a training process of a machine learning model for a number of iterations τ to generate a model parameter 210A based at least in part on a local dataset 206A of the edge node 204A and a global model parameter 208, where edge nodes 204, including edge node 204A, and synchronization node 202 are part of a distributed computer system, such as the distributed computer system 110 of FIG. 4. Initial values of the global model parameter 208 and the number of iterations τ can be received from the synchronization node 202. The global model parameter 208 and the model parameter 210A can include one or more loss function parameters vectors (e.g., w of $f_i(w)$) of the machine learning model. The edge nodes 204 can include one or more of: a sensor, a gateway, a microserver, and a wireless communication access node, for example.

At block 404, the edge node 204A estimates a resource parameter set $P_i$ indicative of a plurality of resources available at the edge node 204A. The resource parameter set $P_i$ may include, for instance, a plurality of metrics comprising at least two of: an indicator of available computation resources at the edge node 204A, an indicator of available communication resources between the edge node 204A and the synchronization node 202, an indicator of data distribution of the local dataset 206A, and an indicator of noisiness of the local dataset 206A. The indicator of data distribution of the local dataset 206A can be estimated based at least in part on a function computed on a plurality of gradients computed at the edge nodes 204. The indicator of noisiness of the local dataset 206A can be based at least in part on a metric indicating the statistical divergence of data samples in the local dataset 206A. For instance, the statistical divergence can be estimated by projecting each data sample in the local dataset onto a low dimensional subspace, and computing the distance among data samples after the projection.

At block 406, edge node 204A sends the model parameter 210A and the resource parameter set $P_i$ to synchronization node 202. The model parameter 210 and the resource parameter set $P_i$ of the edge nodes 204 (e.g., including data from edge nodes 204A-204N) are received at the synchronization node 202. The synchronization node 202 can determine an amount of remaining resources R with respect to a resource budget B for the training process of the machine learning model. The synchronization node 202 can update the number of iterations τ based at least in part on the amount of remaining resources R and the resource parameter set $P_i$ of the edge nodes 204. The synchronization node 202 can update the global model parameter 208 based at least in part on the model parameter 210 from the edge nodes 204. The synchronization node 202 can send updates of the global model parameter 208 and the number of iterations τ to the edge nodes 204. The resource budget B can be based at least in part on a time, energy, or cost affected by a plurality of computation resources and communication resources of the edge nodes 204.

At block 408, edge node 204A receives updates to the global model parameter 208 and the number of iterations τ from the synchronization node 202, where the updates are based at least in part on the model parameter 210A and the resource parameter set $P_i$ of a plurality of edge nodes 204.

At block 410, the training process of the machine learning model is repeated at the edge node 204A to determine an update to the model parameter 210A based at least in part on the local dataset 206A and updates to the global model parameter 208 and the number of iterations τ from the synchronization node 202. The synchronization node 202 can continue to update the number of iterations τ and the global model parameter 208 until training of the machine learning model completes or the resource budget B is exceeded. The number of iterations $\tau$ may change based on changes to the resource parameter set $P_i$ and/or changes to the amount of remaining resources R. Completion of the training process can be determined based on either reaching the resource budget B or determining that the parameter has converged, where the parameter convergence can be determined based on the observation that the variation in the global model parameter 208 approaches zero as training time increases and the resource budget B remains satisfied.

Additional processes also can be included, and it should be understood that the processes depicted herein represent illustrations and that other processes can be added or existing processes can be removed, modified, or rearranged without departing from the scope and spirit of one or more embodiments of the present invention.

The present techniques can be implemented as a system, a method, and/or a computer program product. The computer program product can include a computer readable storage medium (or media) having computer readable program instructions thereon for causing a processor to carry out aspects of one or more embodiments of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of one or more embodiments of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments of the present invention.

Aspects of one or more embodiments of the present invention are described herein with reference to flowchart illustrations and/or block diagrams of methods, apparatus (systems), and computer program products according to one or more embodiments of the present invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of one or more embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for distributed machine learning at an edge node of a distributed computer system comprising a plurality of edge nodes and a synchronization node, the method comprising:
    executing, by the edge node, a training process of a machine learning model for a number of iterations to generate a model parameter based at least in part on a local dataset of the edge node and a global model parameter of the distributed computer system;
    estimating, by the edge node, a resource parameter set indicative of a plurality of resources available at the edge node;
    sending the model parameter and the resource parameter set to the synchronization node of the distributed computing system;
    receiving, at the edge node, updates to the global model parameter and the number of iterations from the synchronization node based at least in part on the model parameter and the resource parameter set of the plurality of edge nodes of the distributed computer system, wherein updates to the global model parameter and updates to the number of iterations to perform the training process of the machine learning model are broadcast to the plurality of edge nodes by the synchronization node, and wherein updates to the number of iterations define a number of training steps to be performed between two global synchronizations for each of the plurality of edge nodes; and
    repeating the training process of the machine learning model at the edge node to determine an update to the model parameter based at least in part on the local dataset and updates to the global model parameter and the number of iterations from the synchronization node.

2. The computer-implemented method of claim 1, wherein the resource parameter set comprises a plurality of metrics comprising at least two of:
    an indicator of available computation resources at the edge node;
    an indicator of available communication resources between the edge node and the synchronization node;
    an indicator of data distribution of the local dataset; and
    an indicator of noisiness of the local dataset.

3. The computer-implemented method of claim 2, wherein the indicator of data distribution of the local dataset is estimated based at least in part on a function computed on a plurality of gradients computed at the edge nodes.

4. The computer-implemented method of claim 2, wherein the indicator of noisiness of the local dataset is based at least in part on a function of a subset of data samples in the local dataset.

5. The computer-implemented method of claim 1, further comprising:
    receiving initial values of the global model parameter and the number of iterations from the synchronization node.

6. The computer-implemented method of claim 5, further comprising:
    receiving the model parameter and the resource parameter set of the edge nodes at the synchronization node;
    determining an amount of remaining resources with respect to a resource budget for the training process of the machine learning model;
    updating the number of iterations based at least in part on the amount of remaining resources and the resource parameter set of the edge nodes;
    updating the global model parameter based at least in part on the model parameter from the edge nodes; and
    sending updates of the global model parameter and the number of iterations to the edge nodes.

7. The computer-implemented method of claim 6, wherein the resource budget is based at least in part on a time, energy, monetary cost, or non-monetary cost affected by a plurality of computation resources and communication resources of the edge nodes.

8. The computer-implemented method of claim 6, further comprising:
    continuing to update the number of iterations and the global model parameter by the synchronization node until training of the machine learning model completes or the resource budget is exceeded.

9. The computer-implemented method of claim 1, wherein the global model parameter and the model parameter comprise one or more loss function parameter vectors of the machine learning model.

10. The computer-implemented method of claim 1, wherein the edge nodes comprise one or more entities comprising computation and networking capability.

11. A system for distributed machine learning at an edge node of a distributed computer system comprising a plurality of edge nodes and a synchronization node, the system comprising:
    a memory of the edge node comprising computer readable instructions; and
    a processing device of the edge node for executing the computer readable instructions for performing a method, the method comprising:
        executing a training process of a machine learning model at the edge node for a number of iterations to generate a model parameter based at least in part on a local dataset of the edge node and a global model parameter of the distributed computer system;
        estimating a resource parameter set indicative of a plurality of resources available at the edge node;
        sending the model parameter and the resource parameter set to the synchronization node of the distributed computing system;
        receiving updates to the global model parameter and the number of iterations from the synchronization node based at least in part on the model parameter and the resource parameter set of the plurality of edge nodes of the distributed computer system, wherein updates to the global model parameter and updates to the number of iterations to perform the training process of the machine learning model are broadcast to the plurality of edge nodes by the synchronization node, and wherein updates to the number of iterations define a number of training steps to be performed between two global synchronizations for each of the plurality of edge nodes; and repeating the training process of the machine learning model to determine an update to the model parameter based at least in part on the local dataset and updates to the global model parameter and the number of iterations from the synchronization node.

12. The system of claim 11, wherein the resource parameter set comprises a plurality of metrics comprising at least two of: an indicator of available computation resources at the edge node, an indicator of available communication resources between the edge node and the synchronization node, an indicator of data distribution of the local dataset, and an indicator of noisiness of the local dataset.

13. The system of claim 12, wherein the indicator of data distribution of the local dataset is estimated based at least in part on a function computed on a plurality of gradients computed at the edge nodes and the indicator of noisiness of the local dataset is based at least in part on a function of a subset of data samples in the local dataset.

14. The system of claim 11, wherein initial values of the global model parameter and the number of iterations are received from the synchronization node.

15. The system of claim 14, further comprising the synchronization node, wherein the synchronization node is configured to perform a plurality of operations comprising:
receiving the model parameter and the resource parameter set of the edge nodes at the synchronization node;
determining an amount of remaining resources with respect to a resource budget for the training process of the machine learning model;
updating the number of iterations based at least in part on the amount of remaining resources and the resource parameter set of the edge nodes;
updating the global model parameter based at least in part on the model parameter from the edge nodes; and
sending updates of the global model parameter and the number of iterations to the edge nodes.

16. The system of claim 15, wherein the resource budget is based at least in part on a time, energy, monetary cost, or non-monetary cost affected by a plurality of computation resources and communication resources of the edge nodes.

17. The system of claim 15, wherein the synchronization node is configured to perform the operations comprising:
continuing to update the number of iterations and the global model parameter by the synchronization node until training of the machine learning model completes or the resource budget is exceeded.

18. The system of claim 11, wherein the global model parameter and the model parameter comprise one or more loss function parameter vectors of the machine learning model.

19. The system of claim 11, wherein the edge nodes comprise one or more entities comprising computation and networking capability.

20. A computer program product for distributed machine learning at an edge node of a distributed computer system comprising a plurality of edge nodes and a synchronization node, the computer program product comprising:
a computer readable storage medium having program instructions embodied therewith, the program instructions executable by a processing device to cause the processing device to perform a method comprising:
executing a training process of a machine learning model at the edge node for a number of iterations to generate a model parameter based at least in part on a local dataset of the edge node and a global model parameter of the distributed computer system;
estimating, by the edge node, a resource parameter set indicative of a plurality of resources available at the edge node;
sending the model parameter and the resource parameter set to a synchronization node of the distributed computing system;
receiving at the edge node updates to the global model parameter and the number of iterations from the synchronization node based at least in part on the model parameter and the resource parameter set of the plurality of edge nodes of the distributed computer system, wherein updates to the global model parameter and updates to the number of iterations to perform the training process of the machine learning model are broadcast to the plurality of edge nodes by the synchronization node, and wherein updates to the number of iterations define a number of training steps to be performed between two global synchronizations for each of the plurality of edge nodes; and
repeating the training process of the machine learning model at the edge node to determine an update to the model parameter based at least in part on the local dataset and updates to the global model parameter and the number of iterations from the synchronization node.

* * * * *